United States Patent [19]
Noll

[11] Patent Number: 5,743,413
[45] Date of Patent: Apr. 28, 1998

[54] EXPANDABLE SHELF KIT/LOG HOLDER

[76] Inventor: Ronald C. Noll, 20749 University Blvd., Shaker Heights, Ohio 44122

[21] Appl. No.: 418,587

[22] Filed: Apr. 6, 1995

[51] Int. Cl.$^6$ .................................................. A47F 7/00
[52] U.S. Cl. ..................... 211/60.1; 211/175; 211/189; 403/205; 403/403
[58] Field of Search .................... 211/49.1, 60.1, 211/201, 189, 175; 108/155, 186, 187, 137; 403/3, 4, 205, 230, 403; 52/653.1, 655.1

[56] References Cited

U.S. PATENT DOCUMENTS

| | | | |
|---|---|---|---|
| 732,037 | 6/1903 | Best | 211/60.1 |
| 2,539,809 | 1/1951 | Buckley | 211/49.1 |
| 3,187,901 | 6/1965 | Wilson . | |
| 4,355,725 | 10/1982 | Humphrey | 211/49.1 |
| 4,411,547 | 10/1983 | Johnson | 403/205 |
| 4,449,842 | 5/1984 | Reichman, Jr. . | |
| 4,616,757 | 10/1986 | Hobson . | |
| 4,685,576 | 8/1987 | Hobson . | |
| 4,765,491 | 8/1988 | Mueller . | |
| 4,825,620 | 5/1989 | Johnson | 52/655.1 |
| 4,971,207 | 11/1990 | Baucom . | |
| 5,048,429 | 9/1991 | Freiberg | 108/187 |

FOREIGN PATENT DOCUMENTS 2055290  3/1981  United Kingdom ................... 211/189

*Primary Examiner*—Michael Safavi
*Attorney, Agent, or Firm*—Pearne, Gordon, McCoy & Granger LLP

[57] ABSTRACT

An adjustable firewood rack is provided that includes a pair of horizontally disposed lengths of 2×4 lumber and four universal brackets each having a channel receiving an end of the lengths of 2×4 lumber. The universal brackets include a bottom wall, side walls extending from opposite sides of the bottom wall to form the channel, and flanges outwardly extending from the side walls at an open end of the channel. Interchangeably mounted between pairs of the universal brackets are U-shaped tubular supports and 2×4 lumber support assemblies. The universal brackets have both a two bolt-hole pattern for mounting the U-shaped tubular supports and a square four bolt-hole pattern for mounting the 2×4 lumber support assemblies. The 2×4 lumber support assemblies comprise a pair of vertically disposed lengths of 2×4 lumber and a cross member. The cross member includes another pair of the universal brackets to support the vertically disposed lengths of 2×4 lumber, and a tube connecting the pair of universal brackets.

15 Claims, 6 Drawing Sheets

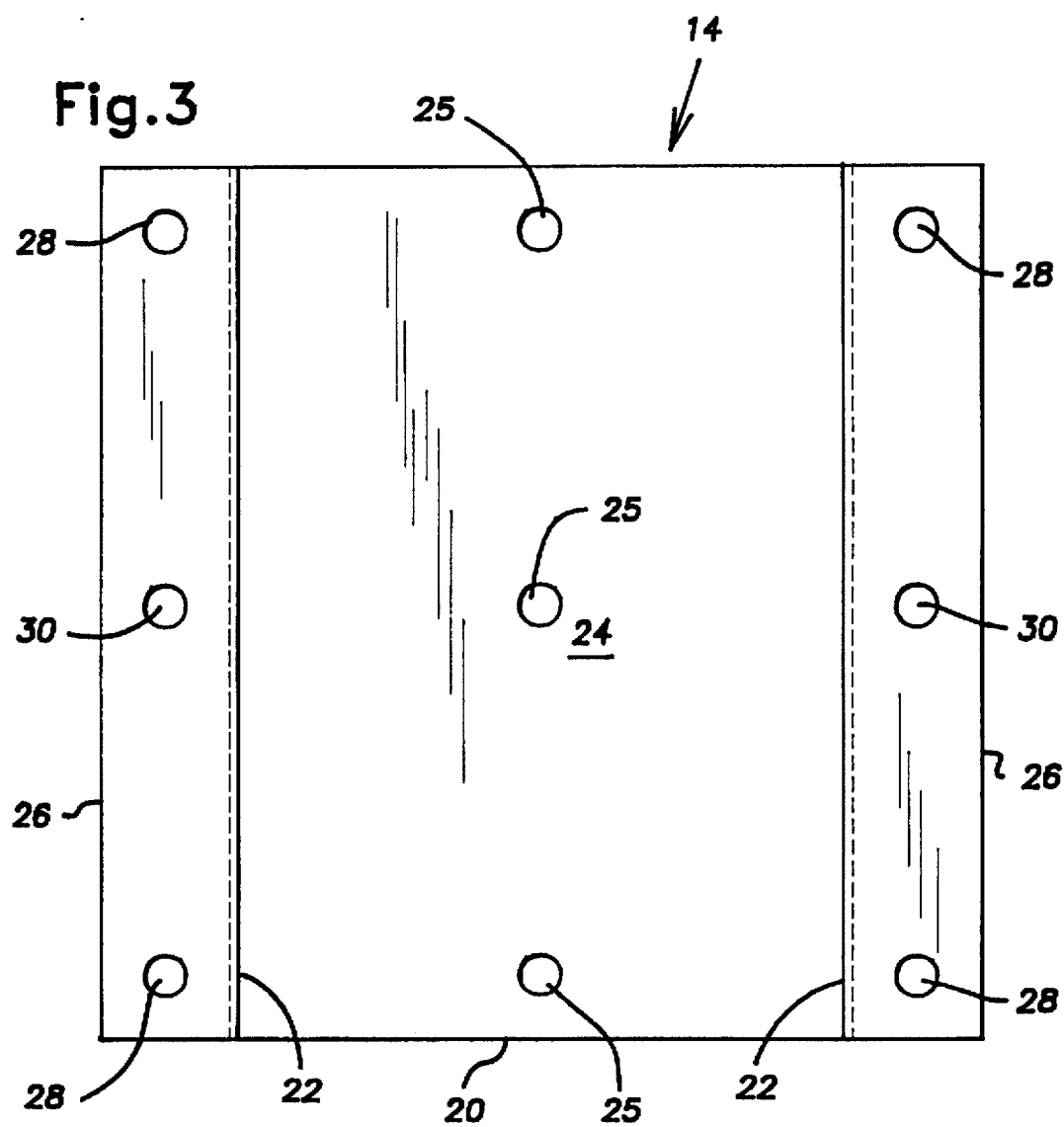
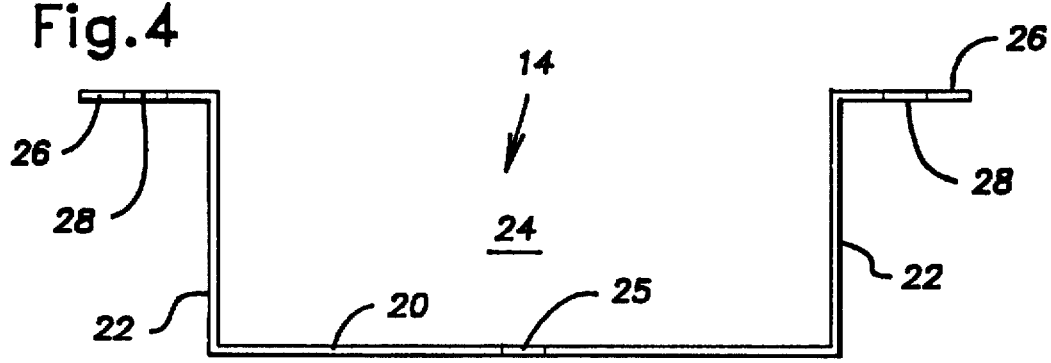

EXPANDABLE SHELF KIT/LOG HOLDER

BACKGROUND OF THE INVENTION

1. Field of the Invention

The present invention relates to adjustable racks or shelves for stacking articles and, more particularly, to a universal bracket for an adjustable rack that mounts different types of supports.

2. Description of Related Art

Firewood is best stored in stacks wherein individual logs are placed in rows on top of each other in a parallel relationship and the stack is supported above ground level. This stacking method allows air to readily circulate between the logs to dry the logs out. It is relatively difficult, however, to efficiently stack large quantities of logs without supporting the ends of the stacks. Therefore, racks have been devised which support the stacks above ground level and/or support the ends of the stack.

A first type of rack includes a pair of horizontally disposed and parallelly spaced tubular members upon which the stack is placed. Inverted U-shaped tubular supports connect the ends of the tubular members to support the ends of the stack. See, for example, U.S. Pat. Nos. 4,971,207, 4,765,491, and 3,187,901.

A second type of rack is constructed from precut lengths of 2×4 lumber and four corner brackets. The corner brackets receive the lengths of 2×4 lumber in three perpendicular axes. The lumber can be cut to a desired length and are movable within the brackets to adjust the size of the rack. Therefore, the rack is adjustable in each axis for varying size stacks. See, for example, U.S. Pat. Nos. 4,685,576, 4,616, 757, and 4,449,842.

Combinations of the first and second types of racks have been devised wherein the rack is constructed of corner brackets and precut lengths of 2×4 lumber in only one or two axes and tubular members are provided to connect the corner brackets in the remaining axes. This type of rack is adjustable in one or two axes. Different brackets, however, are required for each of the different types of racks and within the same racks. Accordingly, there is a need in the art for a universal bracket that can be used in more than one application to reduce the number of unique parts and thereby reduce the cost of manufacturing the various types of racks.

SUMMARY OF THE INVENTION

The present invention provides an adjustable rack or shelf for receiving articles which includes a pair of horizontally disposed frame members and a plurality of universal brackets each having a channel sized and shaped for receipt of the horizontally disposed frame members. The channels are horizontally disposed to receive the horizontally disposed frame members. A pair of U-shaped supports and a pair of support assemblies are interchangeably mounted between an associated pair of the brackets. The universal brackets have means for mounting the U-shaped supports and the support assemblies. Each support assembly includes a pair of vertically disposed frame members and a cross member supporting the vertically disposed frame members and connecting the associated pair of universal brackets. In a preferred embodiment, the cross member includes a pair of the universal brackets with vertically disposed channels receiving the vertically disposed frame members.

BRIEF DESCRIPTION OF THE DRAWINGS

These and further features of the present invention will be apparent with reference to the following description and drawings, wherein:

FIG. 3 is a plan view of a universal bracket for the adjustable racks of FIGS. 1 and 2;

FIG. 4 is an elevational view of the universal bracket of FIG. 3;

DETAILED DESCRIPTION OF THE PREFERRED EMBODIMENT

Figure 1:
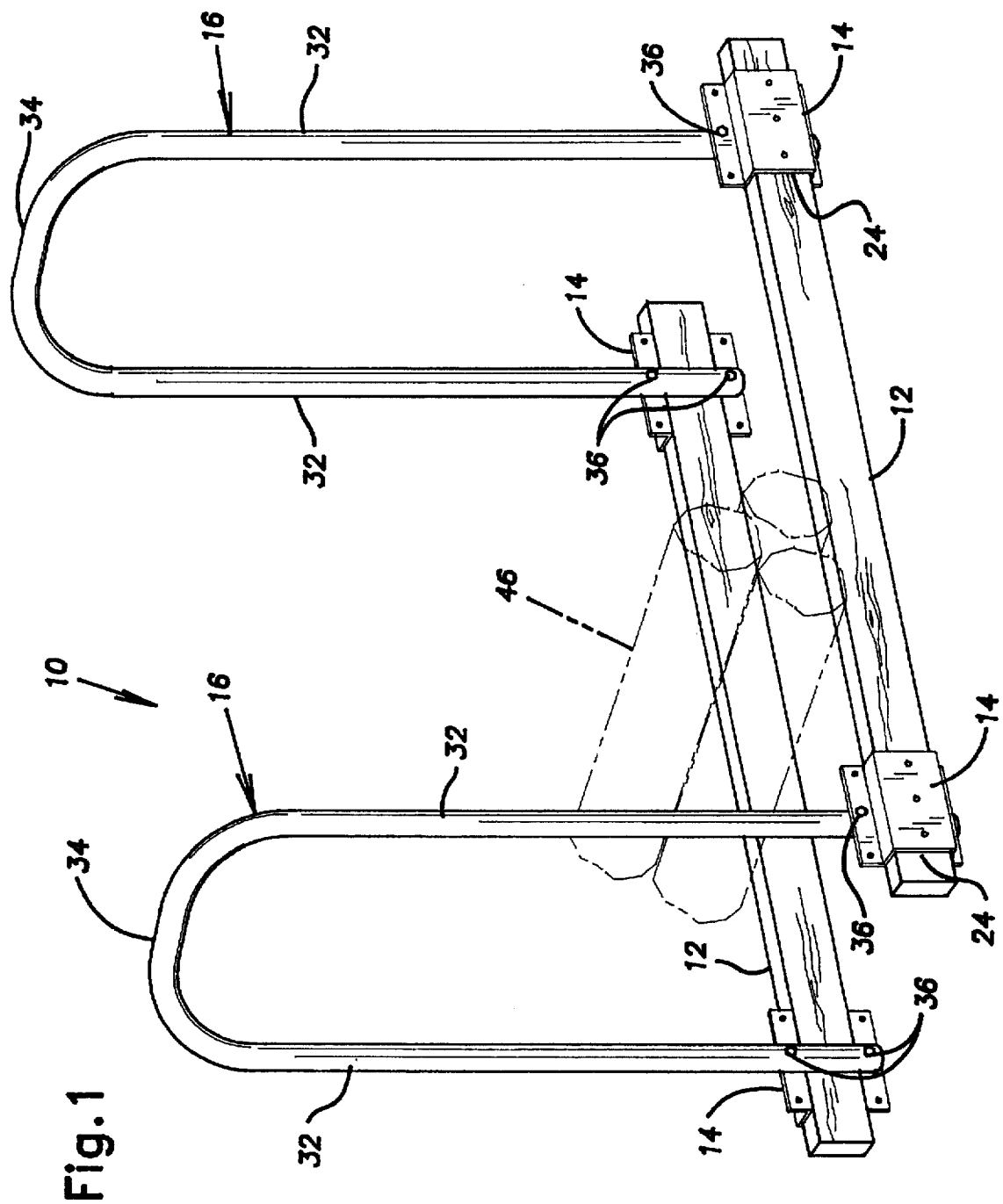
FIG. 1 is a prospective view of an adjustable rack for firewood according to the present invention.
Figure 2:
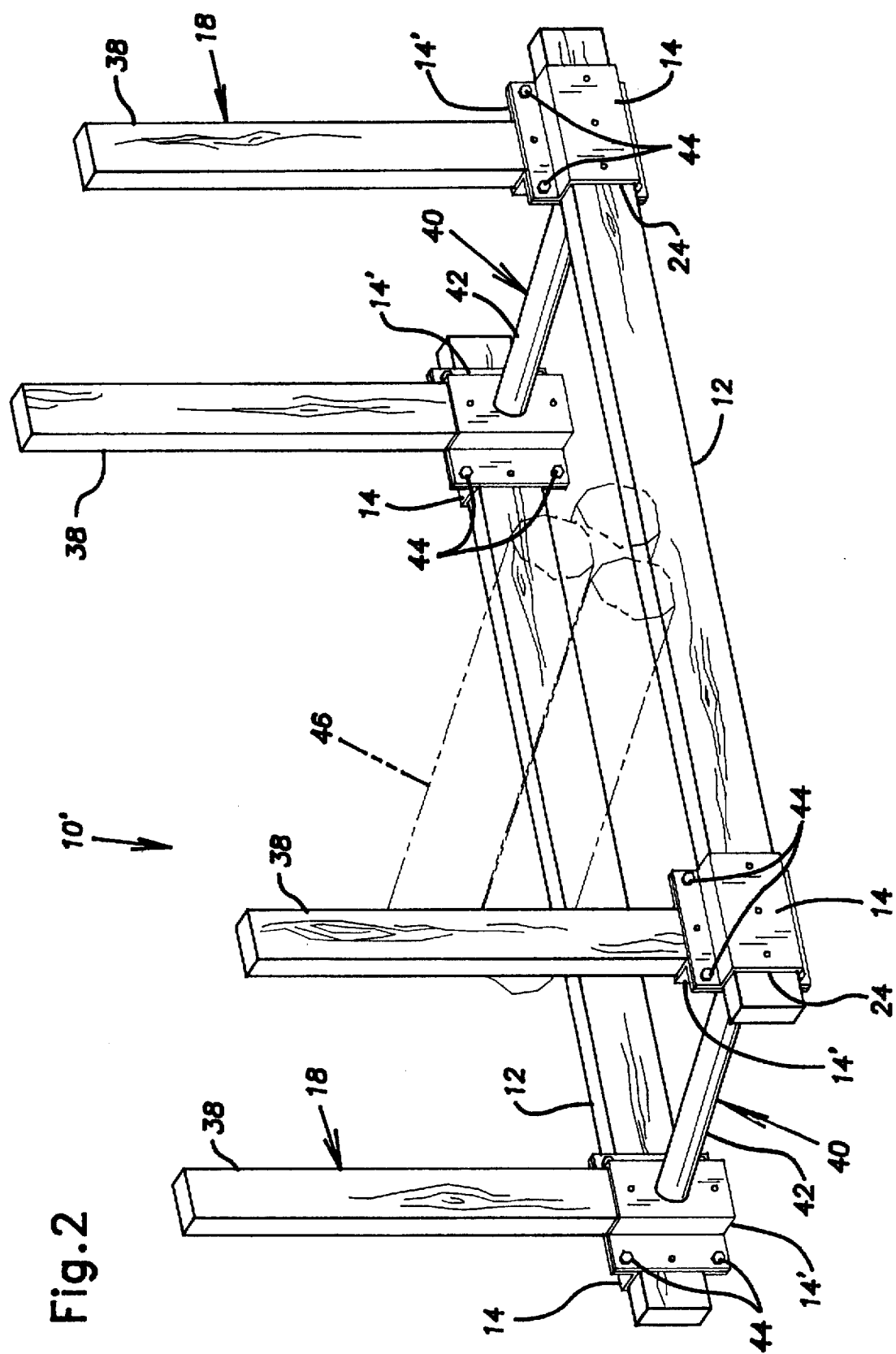
FIG. 2 is a prospective view of another adjustable rack for firewood according to the present invention.

FIGS. 1 and 2 illustrate adjustable racks 10, 10' for receiving articles such as firewood. Each of the adjustable racks 10, 10' include a pair of horizontally disposed frame members or base members 12 and four adjustment or universal brackets 14. The universal brackets 14 are adapted for alternatively mounting a pair of U-shaped supports 16 (FIG. 1) or a pair of support assemblies 18 (FIG. 2) which space apart the base members 12 and provide support for the articles to be stacked on the adjustable rack 10, 10'. The universal brackets 14 reduce the number of unique parts required by the adjustable racks 10, 10' and thereby reduce the cost of manufacturing the adjustable racks 10, 10'.

The base members 12 are elongate members having a generally rectangularly-shaped cross-section. Preferably, the base members 12 are lengths of 2×4 lumber. It should be noted however that the base members 12 could have other cross-sections and/or could be other materials such as, for example, the base members 12 could be steel tubes.

As best seen in FIGS. 3 and 4, the universal brackets 14 are formed unitary members. The universal brackets 14 are preferably formed from 18 gauge coiled steel. It should be noted however that the universal brackets 14 could be formed or molded from other materials such as, for example, aluminum or plastic. The universal brackets 14 have a bottom wall 20 and side walls 22 perpendicularly extending from the bottom wall 20 to form a channel 24. The channel 24 is sized and shaped for receipt of the base members 12. In the illustrated embodiment, therefore, the channel 24 is sized and shaped for receipt of a length of 2×4 lumber. Preferably, the height of the channel 24 is sized such that the 2×4 lumber is generally flush with the open end of the channel 24 so that a friction fit or a light clamping force can be applied to the 2×4 lumber. Alternatively, the height of the channel 24 can be sized so that either a heavy or no clamping force can be applied to the 2×4 lumber. The bottom wall 20 also includes openings 25 for supporting or attaching the universal brackets to the 2×4 lumber with lags, screws, or other mechanical fasteners. The illustrated embodiment includes three equally spaced openings 25 generally on a longitudinal centerline of the bottom wall 20.

The universal brackets 14 are also provided with means for mounting both the U-shaped supports 16 and the support assemblies 18. The mounting means of the illustrated embodiment includes flanges 26 and two bolt-hole patterns. The flanges 26 perpendicularly and outwardly extend from the side walls 22 at the open end of the channel 24. Located at each end of the flanges 26 are openings 28 which form a four bolt-hole pattern. Located substantially at the center of the length of the flanges 26 are openings 30 which form a two bolt-hole pattern. It should be noted however that other means for mounting both the U-shaped supports 16 and the support assemblies 18 could be utilized.

As seen in FIG. 1, the U-shaped supports 16 include two vertical portions 32 and a cross portion 34. The U-shaped supports 16 are preferably unitary formed members. The U-shaped supports 16 of the illustrated embodiment are formed of 18 gauge steel tube. It should be noted however that the U-shaped supports 16 could have other cross-sections or could be formed of other materials such as, for example, plastic or aluminum. The length of the vertical portions 32 is sized to determine the height of the adjustable rack 10. The length of the cross portion 34 is sized to determine the width of the adjustable rack 10. The illustrated adjustable rack 10 has a width sized for holding an average length of firewood or log 46. A pair of openings are provided at each end of the vertical portions that are sized and located to mate with the openings 30 of the two bolt-hole pattern of the universal brackets 14.

The universal brackets 14 are located at each end of the base members 12 and are horizontally disposed so that the base members 12 extend through the channels 24 of the universal brackets 14. The base members 12 are movable within the channels 24 so that the length of the adjustable rack 10 is adjustable to a maximum length generally equal to the length of the base members 12. The U-shaped supports 16 are located at each end of the base members 12 such that the openings in the ends of the U-shaped supports 16 are adjacent the openings 30 of the two bolt-hole pattern of the universal brackets 14. Mounting hardware or fasteners 36, such as bolts and a hex-nuts, extend through the openings 30 in the universal brackets 14 and the openings in the U-shaped supports 16 to attach the U-shaped supports 16 to the brackets 14. Additionally, lags, screws or other mechanical fasteners 48 (FIG. 6B) can be used to attach the brackets 14 to the base members 12 through the openings 25. The ends of the U-shaped supports overly the open end of the channels 24 of the universal brackets 14 to retain the base members 12 within the channels 24.

As seen in FIG. 2, the support assemblies 18 include two vertically disposed frame members or upright members 38 and a cross member 40. The upright members 38 are elongate members having a generally rectangularly-shaped cross-section. Preferably, the upright members are lengths of 2×4 lumber. It should be noted however that the upright members 38 could have other cross-sections and/or could be other materials such as, for example, the base members 12 could be steel tubes. The length of the upright members 38 is sized to determine the height of the adjustable rack 10'.

The cross member 40 includes two mounting brackets 14' and a connecting tube 42. Preferably, the mounting brackets 14' are identical to the universal brackets 14 in order to further reduce the number of unique parts and thereby further reduce the cost of manufacture. Accordingly, the cross-section of the base members 12 is identical to the cross-section of the upright members 38, the four-hole pattern of the universal brackets 14 is substantially square, and the length and width of the universal brackets 14 are generally equal (as best seen in FIG. 3 and 4).

The connecting tube 42 is preferably a generally straight steel tube having a circular cross-section. It should be noted however that the connecting tube could have other cross-sections or could be formed of other materials, such as, for example, an aluminum square bar. The ends of the connecting tube 42 are attached to the outer side of the bottom walls of the brackets 14'. The connecting tube 42 can be attached in any known manner such as, for example, welding or a socket with a set screw. The length of the connecting tube 42 is sized to determine the width of the adjustable rack 10'. The illustrated adjustable rack 10' has a width sized for holding an average length of firewood or log 46.

The universal brackets 14 are located at each end of the base members 12 and are horizontally disposed so that the base members 12 extend through the channels 24. The base members 12 axially move within the channels 24 so that the length of the adjustable rack 10' is adjustable to a maximum length generally equal to the length of the base members 12. The support assemblies 18 are located at each end of the base members 12 with the brackets 14' vertically disposed so that the upright members 38 extend through the channels 24 of the brackets 14'. The flanges of brackets 14' are positioned adjacent the flanges 26 of the universal brackets 14 such that the respective four-hole patterns are aligned. Mounting hardware or fasteners 44, such as bolts and a hex-nuts, extend through the openings 28 of the four-bolt-hole pattern of the universal brackets 14 and the openings 28 of the four bolt-hole pattern of the mounting brackets 14' to attach the support assemblies 18 to the universal brackets 14. Additionally, lags, screws or other mechanical fasteners 48 (FIG. 6C) can be used to attach the brackets 14' to the upright members 38 through the openings 25. The mounting brackets 14' and the upright members 38 overly the open end of the channels 24 of the universal brackets 14 to retain the base members 12 within the channels 24.

The illustrated adjustable racks 10, 10' are firewood support racks wherein individual lengths of firewood or logs 46 are laid across the base members 12 and supported by the U-shaped supports 16 or upright members 38 to prevent the logs 46 from rolling off the end of the adjustable racks 10, 10'. It should be noted that the base members 12 are slightly above ground level so that the logs 46 are also above ground level, thereby avoiding rotting of the wood and nesting of insects and small animals.

Figure 5:
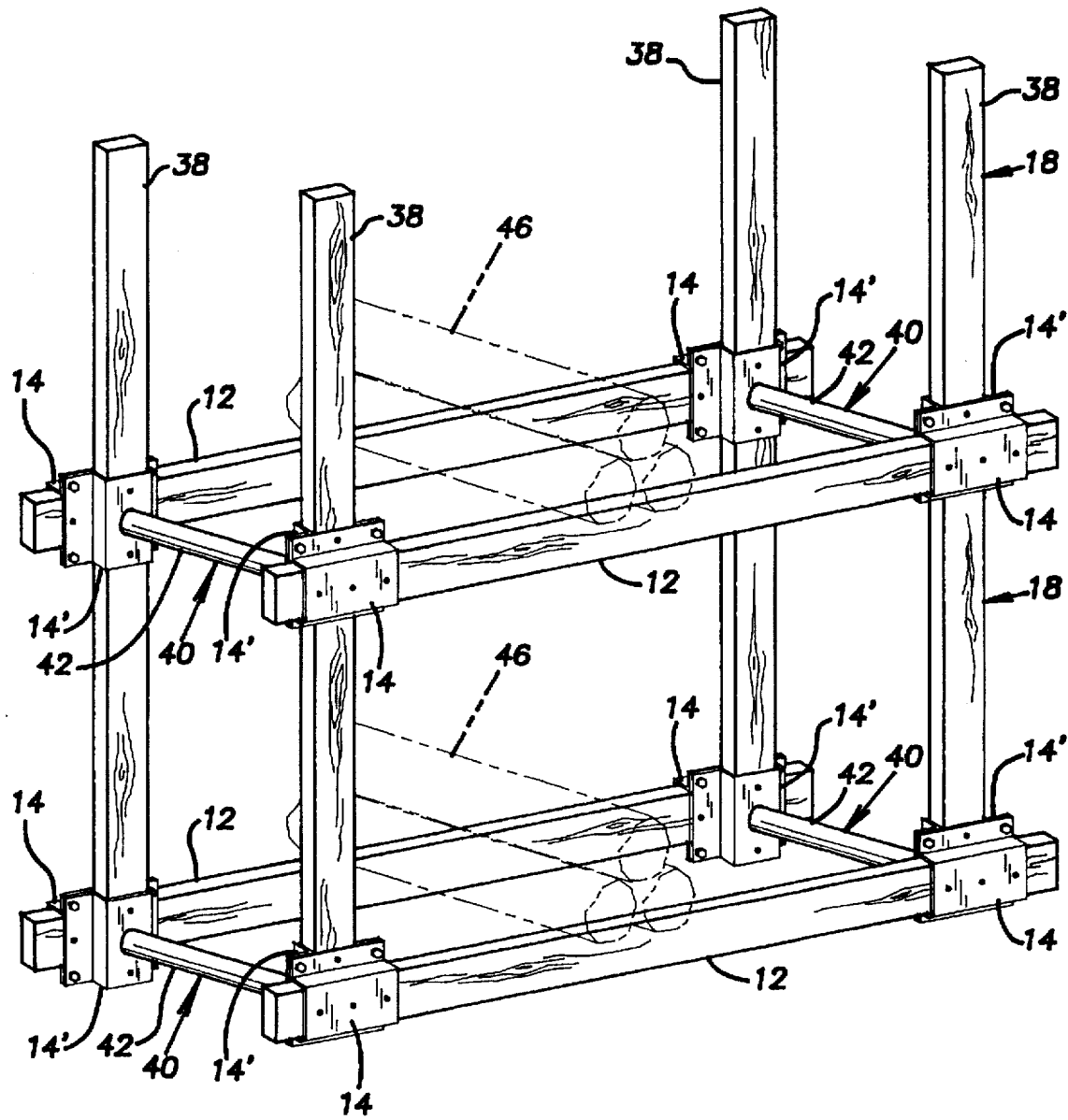
FIG. 5 is a prospective view of a variation of the adjustable rack of FIG. 2 having two levels.

A variation of the log rack 10' of FIG. 2 is illustrated in FIG. 5. Each of the components are as described above and use like numbers, however, additional universal brackets 14, cross members 40, and base members 12 have been added. The additional components form a pair of "vertically stacked" log racks with common upright members 38. The base members 12 can be positioned anywhere along the length of the upright members 38, as seen in FIG. 5, due to the clamping of the universal brackets 14' onto upright members 38 and/or the lags. While FIG. 5 shows two levels, more than two levels can be obtained by further adding components.

Figure 6:
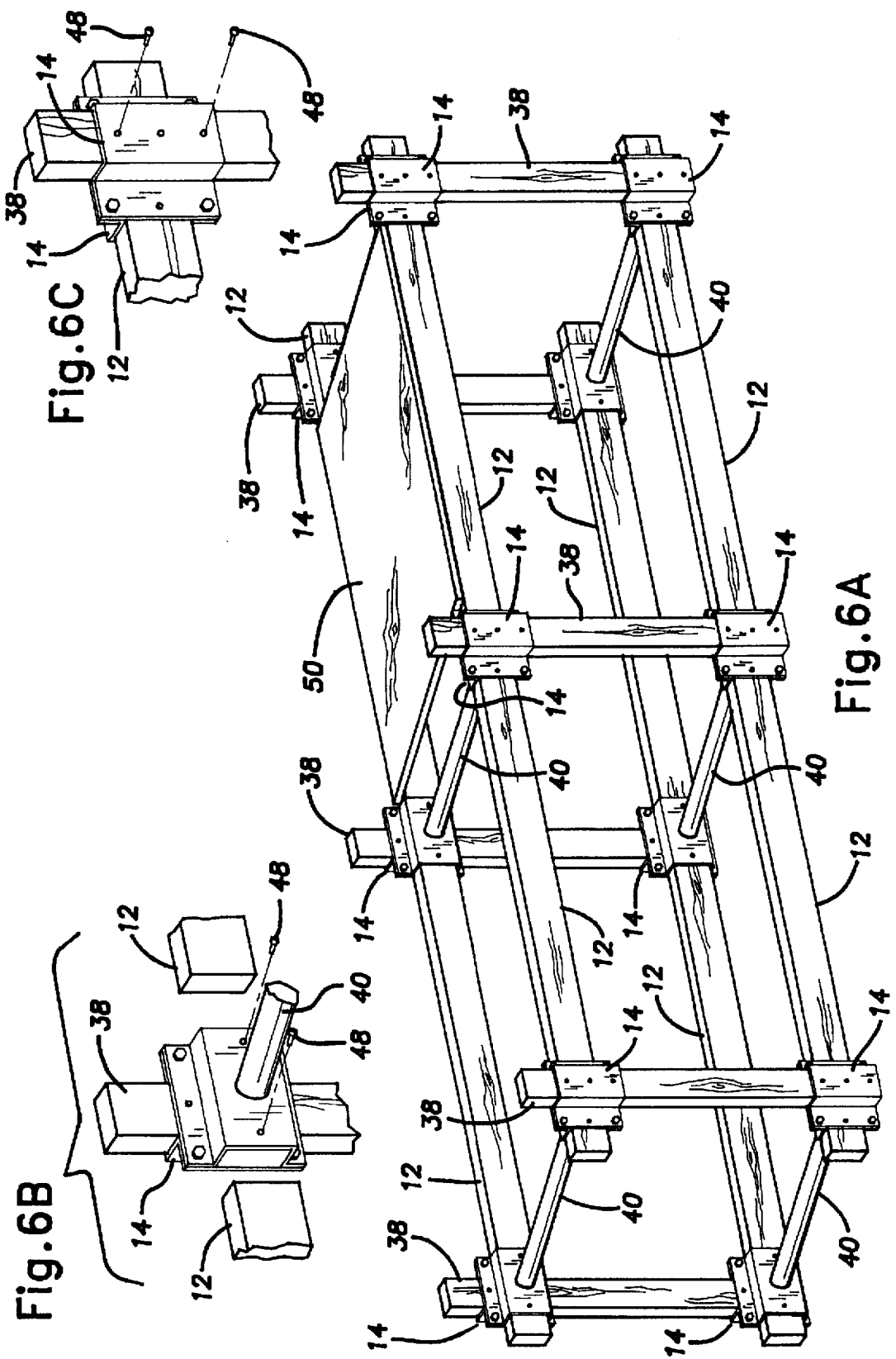
FIG. 6A is a prospective view of another variation of the adjustable rack of FIG. 2 configured as a shelving unit.
FIG. 6B is a partially-exploded fragmental view of the adjustable rack of 6A showing lags attaching base members.
FIG. 6C is a partially-exploded fragmental view of the adjustable rack of 6A showing lags attaching a vertical upright.

Another variation of the log rack 10' of FIG. 2 is illustrated in FIGS. 6A, 6B, 6C. Each of the components are as described above and use like numbers, however, additional components have been added to "vertically and horizontally stack" the racks. The "horizontally stacked" racks can be obtained by using a pair of common vertical uprights 38 and associated universal brackets 14 and cross members 40. In the illustrated embodiment, the base members 12 extend approximately half-way into the common universal brackets and therefore are each attached with a single lag 48, as best shown in FIG. 6B. Alternatively, common base members with a relatively long length could be utilized to extend the full length of the rack. The adjustable rack can be used as a shelving unit by supporting rigid sheets of material 50 across the base members 12 such as, for example, sheets of plywood.

Figure 7:
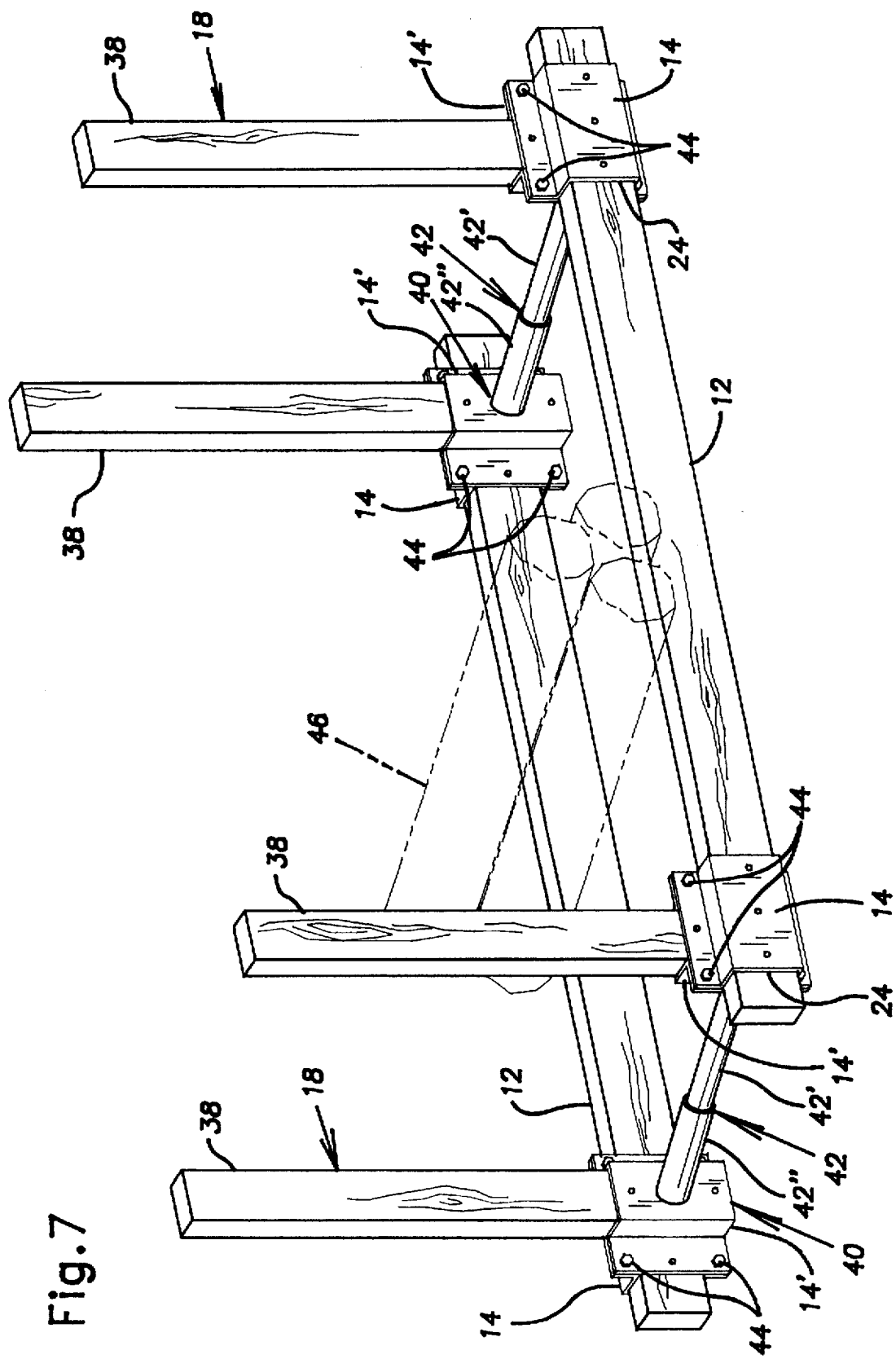
FIG. 7 is a perspective view of yet another variation of the adjustable rack of FIG. 2 having an adjustable cross member.

Yet another variation of the log rack 10' of FIG. 2 is illustrated in FIG. 7. Each of the components are as described above and use like numbers, except that the length of the connecting tube 42 of the cross member 40 is adjustable. The connecting tube 42 includes first and second tube portions 42', 42". The first tube portion 42' is sized to slide within the second tube portion 42" in a telescoping manner so that the length of the connecting tube is adjustable, and therefore, the width of the rack is adjustable. The tube portions 42', 42" are preferably sized such that the width of the rack varies over a range for an average length of firewood or logs 46. Preferably, the connecting tube portions 42', 42" are sized so that the width varies over a range of about 10 inches to about 20 inches.

Although a particular embodiment of the invention has been described in detail, it will be understood that the invention is not limited correspondingly in scope, but includes all changes and modifications coming within the spirit and terms of the claims appended hereto.

What is claimed is:

1. An adjustable rack for receiving articles, said adjustable rack comprising:

a pair of horizontally disposed frame members, said frame members being generally parallel and laterally spaced apart;

a plurality of brackets each having a bottom wall, side walls generally perpendicularly extending from opposite sides of said bottom wall to form a channel sized and shaped for receipt of said horizontally disposed frame members, and flanges generally perpendicularly and outwardly extending from said side walls at an open end of said channel, said channels of said brackets being horizontally disposed and receiving said horizontally disposed frame members, and a pair of inverted U-shaped supports mounted between an associated pair of said brackets to connect and space apart said horizontally disposed frame members, wherein each of said U-shaped supports are bent tubes.

2. The adjustable rack according to claim 1, wherein said frame members are lengths of 2×4 lumber.

3. The adjustable rack according to claim 1, wherein said brackets are unitary members formed from a sheet of metal.

4. The adjustable rack according to claim 1, wherein said means for mounting said U-shaped supports includes openings in said flanges sized and shaped for fasteners.

5. The adjustable rack according to claim 4, wherein said openings include both a two bolt-hole pattern for mounting said U-shaped supports.

6. The adjustable rack according to claim 1, wherein said brackets each have a length and a width which are generally equal.

7. An adjustable rack for receiving articles, said adjustable rack comprising:

a plurality of frame members, at least two of said frame members being horizontally disposed and at least four of said frame members being vertically disposed;

a plurality of brackets each having a bottom wall, side walls generally perpendicularly extending from opposite sides of said bottom wall to form a channel sized for receiving said frame members, and flanges generally perpendicularly and outwardly extending from said side walls at an open end of said channel, wherein a first one of said brackets horizontally disposed and receiving an end of a first one of said horizontally disposed frame members, a second one of said brackets is horizontally disposed and receiving another end of said first one of said horizontally disposed frame members, a third one of said brackets is horizontally disposed and receiving an end of a second one of said horizontally disposed frame members, a fourth one of said brackets is horizontally disposed and receiving another end of said second one of said horizontally disposed frame members, a fifth one of said brackets is vertically disposed and receiving a first of said vertically disposed frame members, a sixth one of said brackets is vertically disposed and receiving a second one of said vertically disposed frame members, a seventh one of said brackets is vertically disposed and receiving a third one of said vertically disposed frame members, and an eighth one of said brackets is vertically disposed and receiving a fourth one of said vertically disposed frame members, said fifth one of said brackets being mounted to said first one of said brackets, said sixth one of said brackets being mounted to said second one of said brackets, said seventh one of said brackets being mounted to said third one of said brackets, and said eighth one of said brackets being mounted to said fourth one of said brackets; and a first connecting element attached to said fifth one of said brackets and said seventh one of said brackets and a second connecting member attached to said sixth one of said brackets and said eighth one of said brackets to connect and space apart said first and second ones of said horizontally disposed frame members.

8. The adjustable rack according to claim 7, wherein said frame members are lengths of 2×4 lumber.

9. The adjustable rack according to claim 7, wherein said brackets include openings in said flanges sized and shaped for fasteners to mount any two of said brackets together.

10. The adjustable rack according to claim 7, wherein said brackets are unitary members formed from a sheet of metal.

11. The adjustable rack according to claim 7, wherein said brackets each have a length and a width which are generally equal.

12. An adjustable rack for receiving articles, said adjustable rack comprising:

at least two horizontally and parallely disposed frame members;

at least four vertically disposed frame members;

a plurality of brackets each having a channel receiving one of said horizontally disposed frame members and said vertically disposed frame members; and connecting elements each fixed to one of said brackets receiving one of said horizontally disposed frame members and one of said brackets receiving another one of said horizontally disposed frame members to connect and space apart said horizontally disposed frame members, wherein a length of each of said connecting elements is adjustable.

13. The adjustable rack according to claim 12, wherein said connecting elements comprise telescoping tubes.

14. The adjustable rack according to claim 12, wherein said length of said connecting elements is adjustable in the range of about 10 inches to about 20 inches.

15. The adjustable rack according to claim 12, wherein said frame members are lengths of 2×4 lumber.

* * * * *